UNITED STATES PATENT OFFICE.

FERDINAND BLUMENTHAL, OF COLOGNE-BRAUNSFELD, GERMANY.

WATER-SOFTENING.

1,212,007.

No Drawing.

Specification of Letters Patent.

Patented Jan. 9, 1917.

Application filed April 26, 1915. Serial No. 24,115.

*To all whom it may concern:*

Be it known that I, FERDINAND BLUMENTHAL, chemist, subject of the King of Prussia, German Emperor, residing at Cologne-Braunsfeld, Germany, have invented certain new and useful Improvements in Water-Softening, of which the following is a specification.

This invention relates to the production of a substance for the softening of water. It is already known to soften water by the use of basic silicate of alumina, sometimes called "permutite," which is produced by fusing together quartz, soda and china clay, and the extraction and lixiviation of the fused product in water.

According to the present invention, however, substances are produced by means of a precipitation process which is both cheaper and simpler than the fusion process, which substances, owing to the high degree of interchangeability of the bases are extremely well suited for the softening of water. The resultant substances have, moreover, the further advantages over "permutite," that they can be preserved in the open air without attracting moisture, that they are resistant to changes in the weather, for a much longer period of time.

The substances according to this invention are obtained by precipitating silicate of soda with soluble iron salts. I prefer to make use of ferrous chlorid, but other soluble iron salts such as, for instance, ferrous sulfate may be used. The precipitation takes place preferably in a very dilute solution, and is carried out in such a manner that the precipitated mixture may always remain as a liquid. By way of example, I take 3 kg. of silicate of soda diluted with 30 liters of water, and precipitate this solution gradually with constant stirring by means of a solution of 750 grams of ferrous chlorid in about 20 liters of water. The precipitated product is washed, (in the case of small quantities preferably decanted) then pressed, and dried at about 100° C. The product then consists of hard lumps with a shining fracture, which when moistened with water break into little particles of 1 to 2 mm. in size. Thereupon the material is again dried at a low temperature. The above example, in which 3 kg. of silicate of soda and 750 g. of ferrous chlorid are employed produces about 1100 g. of non-hygroscopic material.

Having now described my invention, and in what manner the same is produced, what I claim is:—

1. A process for the production of a substance for softening water, consisting in the precipitation of a dilute solution of sodium silicate in a solution of ferrous chlorid, washing and pressing the resultant product or precipitate, then drying the latter, which forms into relatively hard lumps, moistening the lumps sufficiently to cause the same to break into relatively small particles, and then drying said small particles.

2. A process for the production of a substance for softening water, consisting in the precipitation of a solution of three kilograms of sodium silicate and thirty liters of water in a solution of seven hundred and fifty (750) grams ferrous chlorid and twenty liters of water, washing and pressing the resultant product or precipitate, then drying the latter at a temperature of about 100° C. thus forming into relatively hard lumps, moistening the lumps sufficiently to cause the same to break into relatively small particles of one to two millimeters in size, and then drying said small particles at a relatively low temperature.

In testimony whereof I affix my signature in the presence of two witnesses.

FERDINAND BLUMENTHAL.

Witnesses:
 HENRY QUADFLIEG,
 HERM. MERTENS.